*(12)* United States Patent
Fukushima

(10) Patent No.: US 8,350,559 B2
(45) Date of Patent: Jan. 8, 2013

(54) POSITION DETECTION APPARATUS AND SENSOR UNIT

(75) Inventor: Masamitsu Fukushima, Saitama (JP)

(73) Assignee: Wacom Co., Ltd., Saitama (JP)

( * ) Notice: Subject to any disclaimer, the term of this patent is extended or adjusted under 35 U.S.C. 154(b) by 371 days.

(21) Appl. No.: 12/829,195

(22) Filed: Jul. 1, 2010

(65) Prior Publication Data

US 2011/0006759 A1 Jan. 13, 2011

(30) Foreign Application Priority Data

Jul. 13, 2009 (JP) ................................. 2009-164890

(51) Int. Cl.
*G01B 7/14* (2006.01)
(52) U.S. Cl. ............................. 324/207.15; 324/207.11
(58) Field of Classification Search ............. 324/207.11, 324/207.15
See application file for complete search history.

(56) References Cited

U.S. PATENT DOCUMENTS 8,149,220 B2 * 4/2012 Fukushima et al. .......... 345/173

FOREIGN PATENT DOCUMENTS

JP 2007166147 A 6/2007

* cited by examiner

*Primary Examiner* — Reena Aurora
(74) *Attorney, Agent, or Firm* — Seed IP Law Group PLLC

(57) ABSTRACT

A position detection apparatus includes a position pointer having a coil and a sensor unit for detecting the position of the position pointer. The sensor unit has a sensor board including a plurality of loop coils juxtaposed and extending in a predetermined direction, and the sensor unit detects a signal generated in the loop coils by electromagnetic induction between the coil of the position pointer and the loop coils, to thereby detect the position of the position pointer. The sensor unit further includes a shield member disposed on the sensor board remotely from the position pointer for reducing noise, and a magnetic path sheet formed from a plurality of magnetic path members of a substantially rectangular shape having a higher magnetic permeability than that of the shield member and disposed between the sensor board and the shield member. The magnetic path members have mutually contacting portions disposed in an inclined relationship by a predetermined angle relative to said predetermined direction of the sensor board.

11 Claims, 15 Drawing Sheets

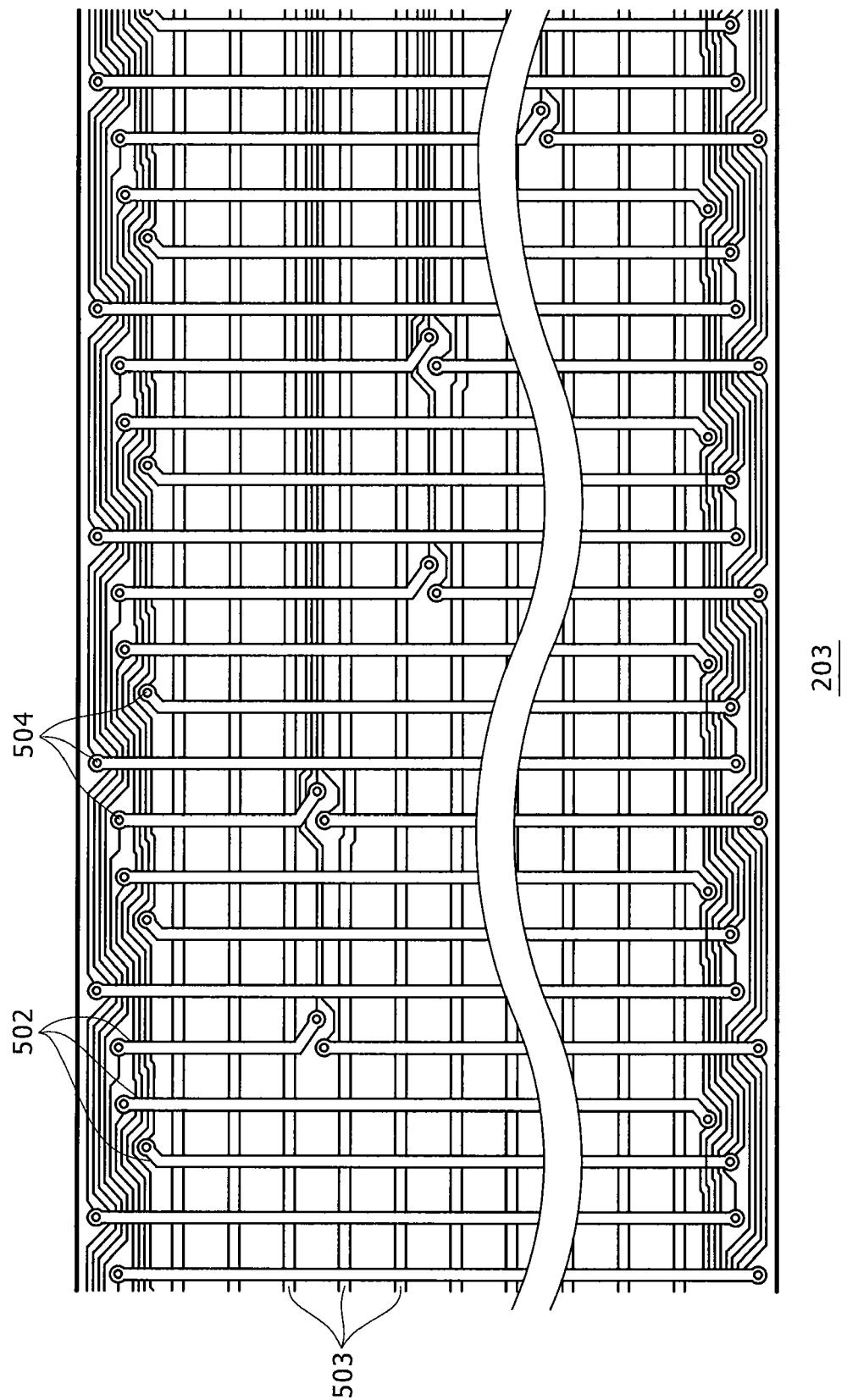

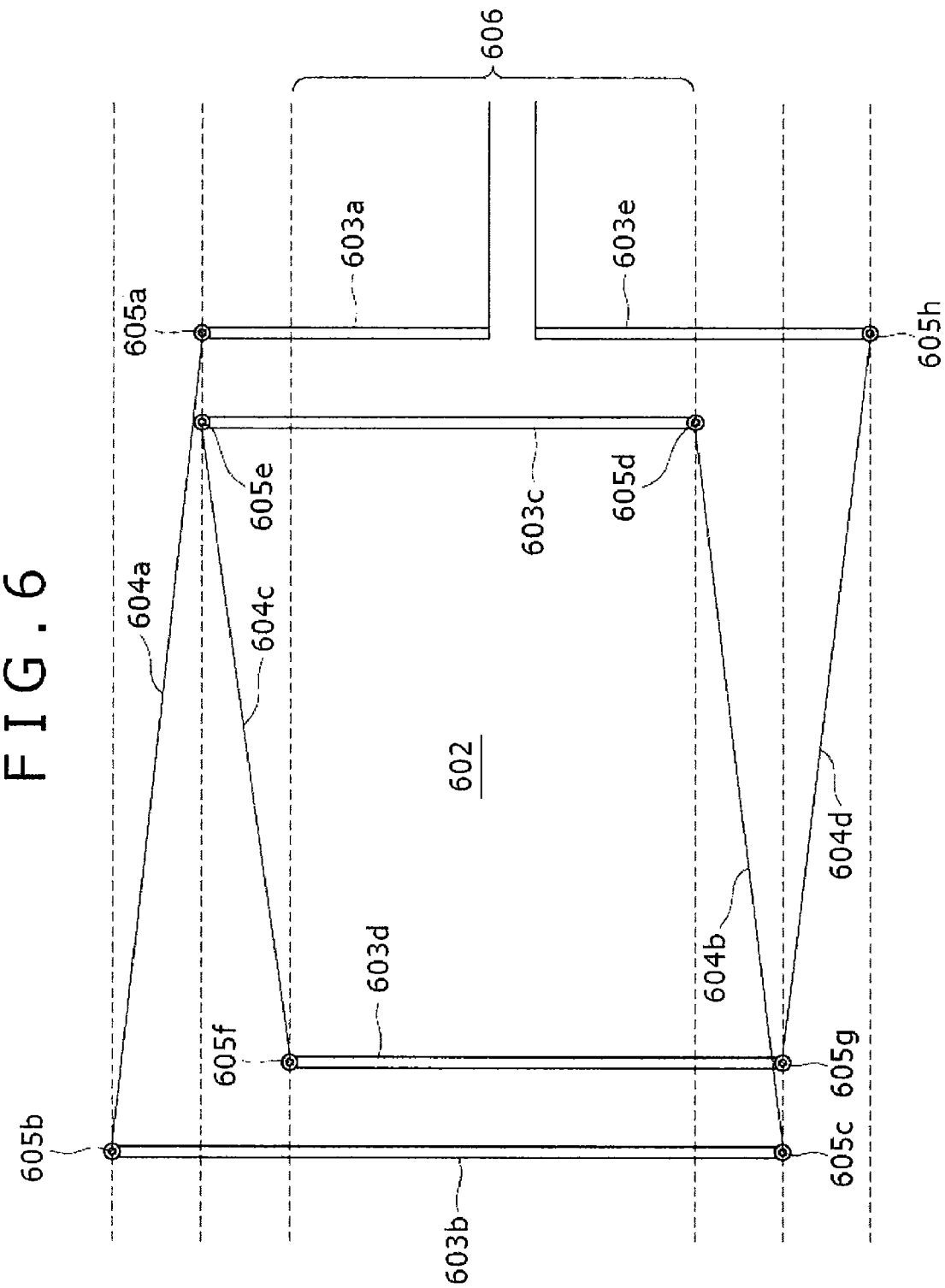

702

702

POSITION DETECTION APPARATUS AND SENSOR UNIT

CROSS-REFERENCE TO RELATED APPLICATION(S)

The present application claims priority to Japanese Patent Application No. 2009-164890, filed Jul. 13, 2009, the entire content of which is incorporated herein by reference.

BACKGROUND OF THE INVENTION

1. Field of the Invention

This invention relates to a technique suitable to be applied to a position detection apparatus and a sensor unit, and more particularly to a technique for enhancing the position detection performance of an electromagnetic induction type digitizer.

2. Description of the Related Art

Various apparatus are available as an inputting apparatus for applying position information to a computer. One of such apparatus is a position detection apparatus generally called a digitizer.

The position detection apparatus is an inputting apparatus having a detection plane for detecting two-dimensional position information, on which a position pointer in the form of a pen is operated, in such a manner as to carry out drawing. The position detection apparatus has been widely popularized as an inputting apparatus suitable for the user who uses an application program in which drawing must be carried out quickly and accurately in the fields of design, art and so forth. The position detection apparatus is configured from a position pointer in the form of a pen for pointing to a position and a sensor unit for detecting a point pointed to by the position pointer and converting the detected information into two-dimensional position information which can be utilized by a computer and then outputting the resulting information.

The sensor unit includes a position detection plane for detecting the position of the position pointer. A printed board wherein loop coils extending in an X-axis direction and a Y-axis direction is embedded in the position detection plane.

The loop coils are each supplied with current having a specific frequency so that a magnetic field is generated therefrom. As a result, a resonance circuit included in the position pointer resonates when the position pointer is positioned in the proximity of a loop coil which is generating the magnetic field. Then, an induced magnetic field generated from the resonance circuit of the position pointer is received by a loop coil. The position of the position pointer is detected by carrying out the operation described above for each of the loop coils.

Japanese Patent Laid-Open No. 2007-166147 assigned to the assignee of the present patent application is listed as a prior art document.

SUMMARY OF THE INVENTION

A position detection apparatus includes a built-in printed board or sensor board, having the above-described loop coils formed thereon, disposed directly below the position detection plane. In order to stabilize a magnetic characteristic of the sensor board, a metal plate of a ferromagnetic material such as a silicon steel lamination is laid directly below the sensor board. However, since the silicon steel lamination is heavy in weight, it is not preferable to apply the silicon steel lamination to a portable PC or a portable telephone set which have begun to be used in recent years. Therefore, a material called magnetic path sheet formed from a thin film of amorphous magnetic metal, which is lighter in weight and better in magnetic characteristic than a silicon steel lamination, has been placed into use.

However, it is difficult to acquire a thin film of amorphous magnetic metal which is sufficiently wide to cover over a wide position detection plane of a position detection apparatus, and accordingly, it is difficult to form a position detection plane which is uniform in quality. Therefore, in some cases, a plurality of belt-shaped ribbons of amorphous magnetic metal are adhered to each other to form a single sheet for covering the position detection plane.

However, if a magnetic path sheet is formed in this manner, then the distribution of magnetic fluxes passing through the magnetic path sheet becomes non-uniform, particularly at a joining location of the magnetic metal ribbons. Therefore, at the joining location of the magnetic metal ribbons, the position detection accuracy of the position detection apparatus sometimes deteriorates to such a degree that position detection data may be output representing that the position pointer exists at a position different from the position at which the position pointer actually exists.

According to one aspect of the present invention, a position detection apparatus is provided, which can be configured at a reduced cost and is improved in position detection accuracy, and a sensor unit is provided which is used to form the position detection apparatus.

According to one embodiment of the present invention, a position detection apparatus is provided, including a position pointer having at least one coil, and a sensor unit having a sensor board including a plurality of loop coils juxtaposed and extending in a predetermined direction. The sensor unit is configured to detect a signal generated in the loop coils by electromagnetic induction between the coil in the position pointer and the loop coils, to thereby detect the position of the position pointer. The sensor unit further includes a shield member disposed on the side of the sensor board opposite to that of the position pointer for reducing noise, and a magnetic path sheet formed from a plurality of magnetic path members of a substantially rectangular shape having a higher magnetic permeability than that of the shield member and disposed between the sensor board and the shield member. The magnetic path members have contacting portions at which the magnetic path members contact with each other, and the contacting portions are disposed in an inclined relationship by a predetermined angle relative to said predetermined direction of the sensor board.

In short, in one embodiment, a magnetic path sheet disposed directly below a sensor board in a position detection apparatus of the electromagnetic induction type is configured by superposing a plurality of magnetic ribbons such that contacting portions between them are disposed in an inclined relationship by a predetermined angle relative to the predetermined direction of the sensor board, in which the plurality of loop coils extend. By configuring the magnetic path sheet in this manner, a variation of the sensitivity of a loop coil in the proximity of a joining portion between the magnetic ribbons can be suppressed. Accordingly, according to one embodiment of the present invention, a position detection apparatus can be implemented which is superior in detection sensitivity of a position pointer, position detection accuracy, noise resistance, and performance.

According to an embodiment of the present invention, a position detection apparatus can be provided which can be configured at a reduced cost and is improved in position detection accuracy.

BRIEF DESCRIPTION OF THE DRAWINGS

FIG. 5 is a schematic plan view of a sensor board shown in FIG. 2;

FIG. 6 is a schematic view showing the shape of wires (or loop coil windings) on the sensor board;

DETAILED DESCRIPTION OF THE PREFERRED EMBODIMENT

In the following, a preferred embodiment of the present invention is described in detail with reference to FIGS. 1 to 15.

Figure 1:
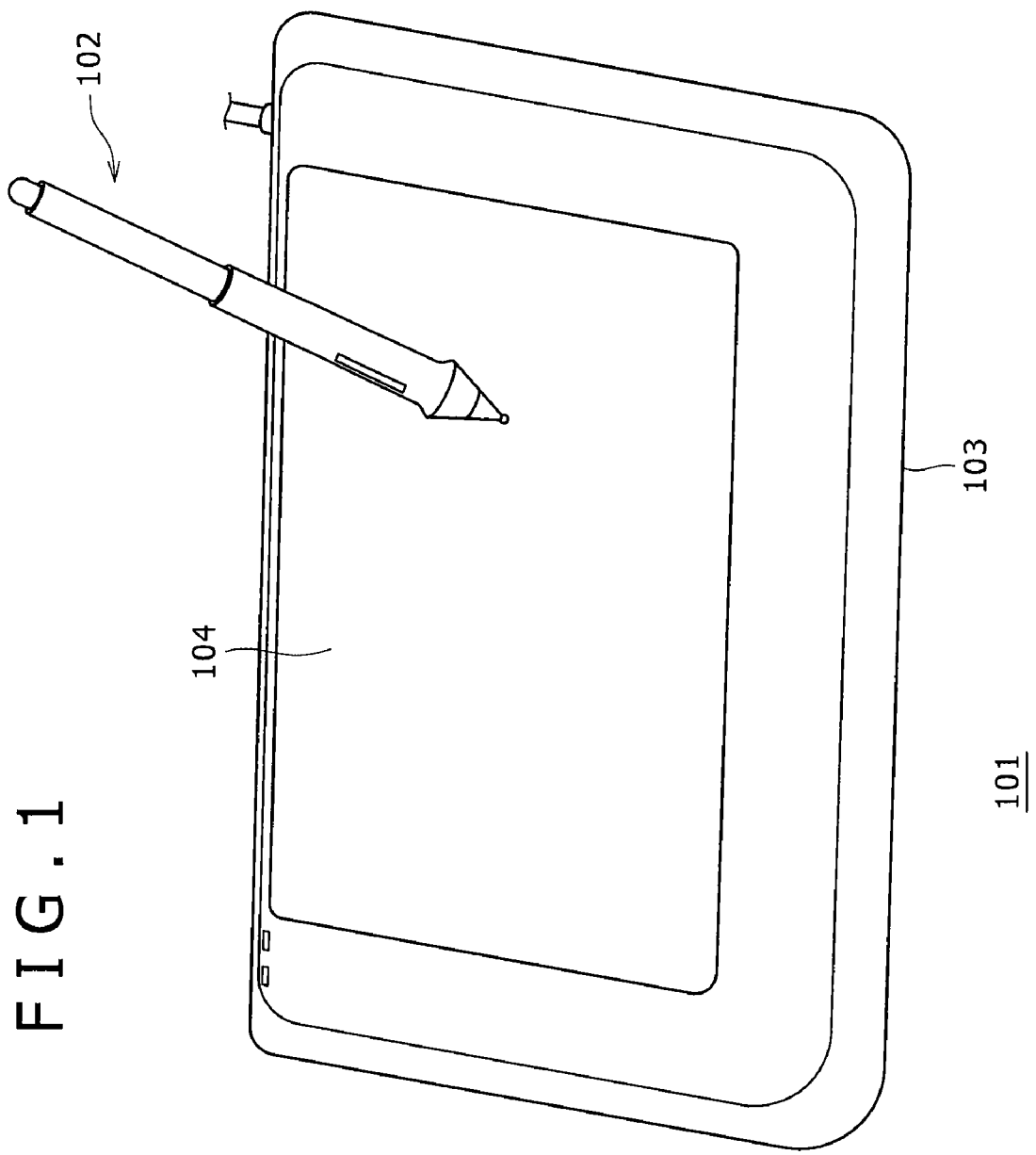
FIG. 1 is a perspective view showing an appearance of a position detection apparatus to which the present invention is applied.

Referring first to FIG. 1, there is shown a position detection apparatus to which the present invention is applied.

The position detection apparatus 101 is of the type usually called a digitizer and includes a position pointer 102 and a sensor unit 103 for detecting the position of the position pointer 102. The sensor unit 103 outputs information regarding the presence and the position of the position pointer 102 on a position detection plane 104 to an external apparatus.

Figure 2:
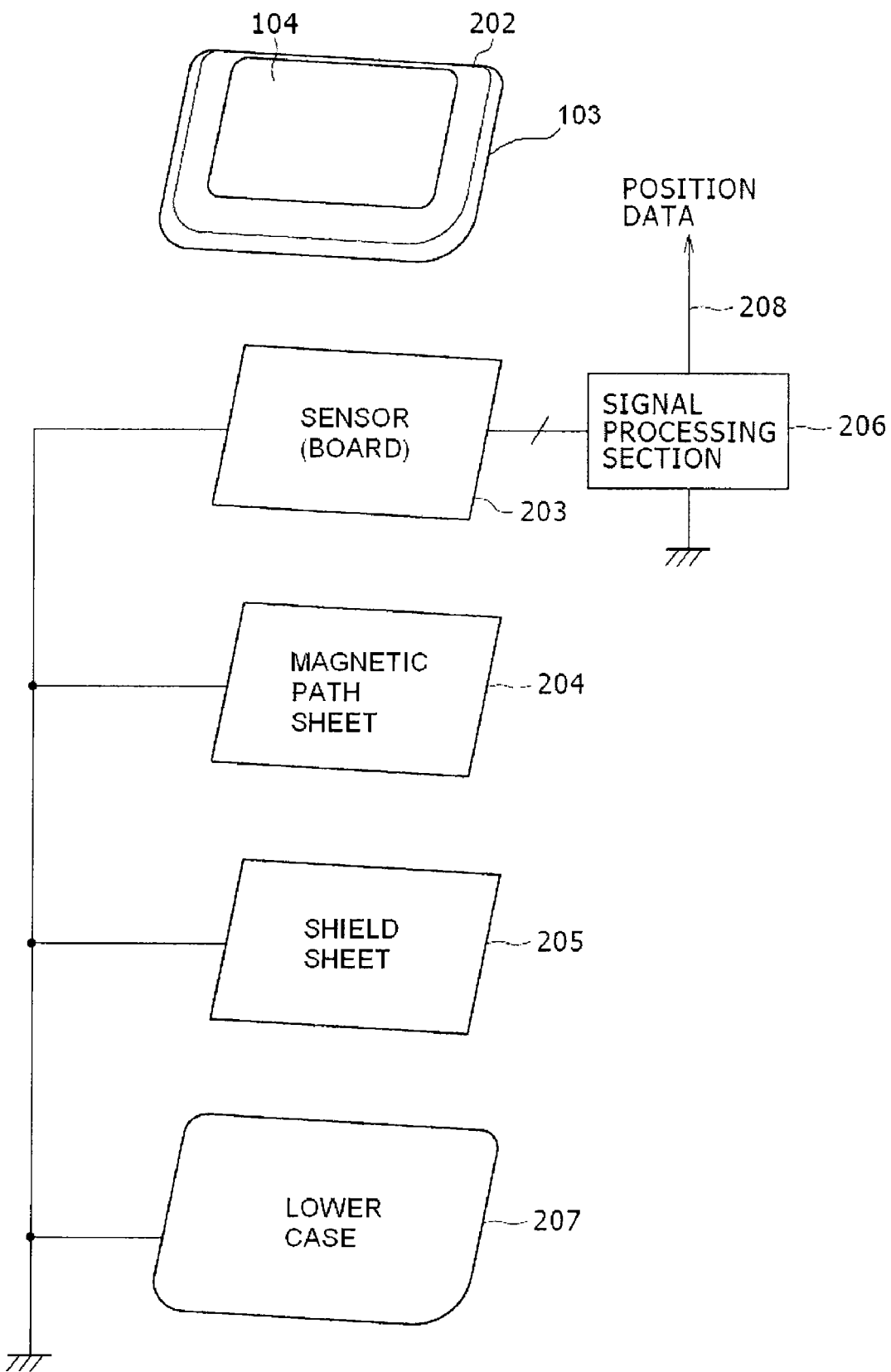
FIG. 2 is an exploded perspective view schematically showing an internal configuration of a sensor unit of the position detection apparatus.

FIG. 2 is an exploded perspective view schematically showing an internal configuration of the sensor unit 103.

The sensor unit 103 includes an upper case 202 which forms an upper face portion of a housing of the position detection apparatus 101. The upper case 202 includes the position detection plane 104 in the form of a flat plate of plastic, glass or the like.

A sensor (or sensor board) 203 is disposed immediately below the position detection plane 104 of the upper case 202.

A magnetic path sheet 204 formed from an amorphous magnetic metal ribbon is disposed immediately below the sensor 203.

A shield sheet 205 formed from aluminum foil is disposed immediately below the magnetic path sheet 204.

The sensor 203, magnetic path sheet 204 and shield sheet 205 and a signal processing section 206 are accommodated in a housing formed from the upper case 202 and a lower case 207.

The signal processing section 206 outputs information regarding the presence and the position of the position pointer 102 to an externally-connected apparatus such as a personal computer through a USB interface cable 208.

The sensor 203 is a double-sided printed board and has a wire pattern of coils of a quadrangular shape in a longitudinal direction and a transverse direction. Details of the shape of the coils wired on the sensor 203 are hereinafter described with reference to FIG. 4 and so forth.

Figure 3:
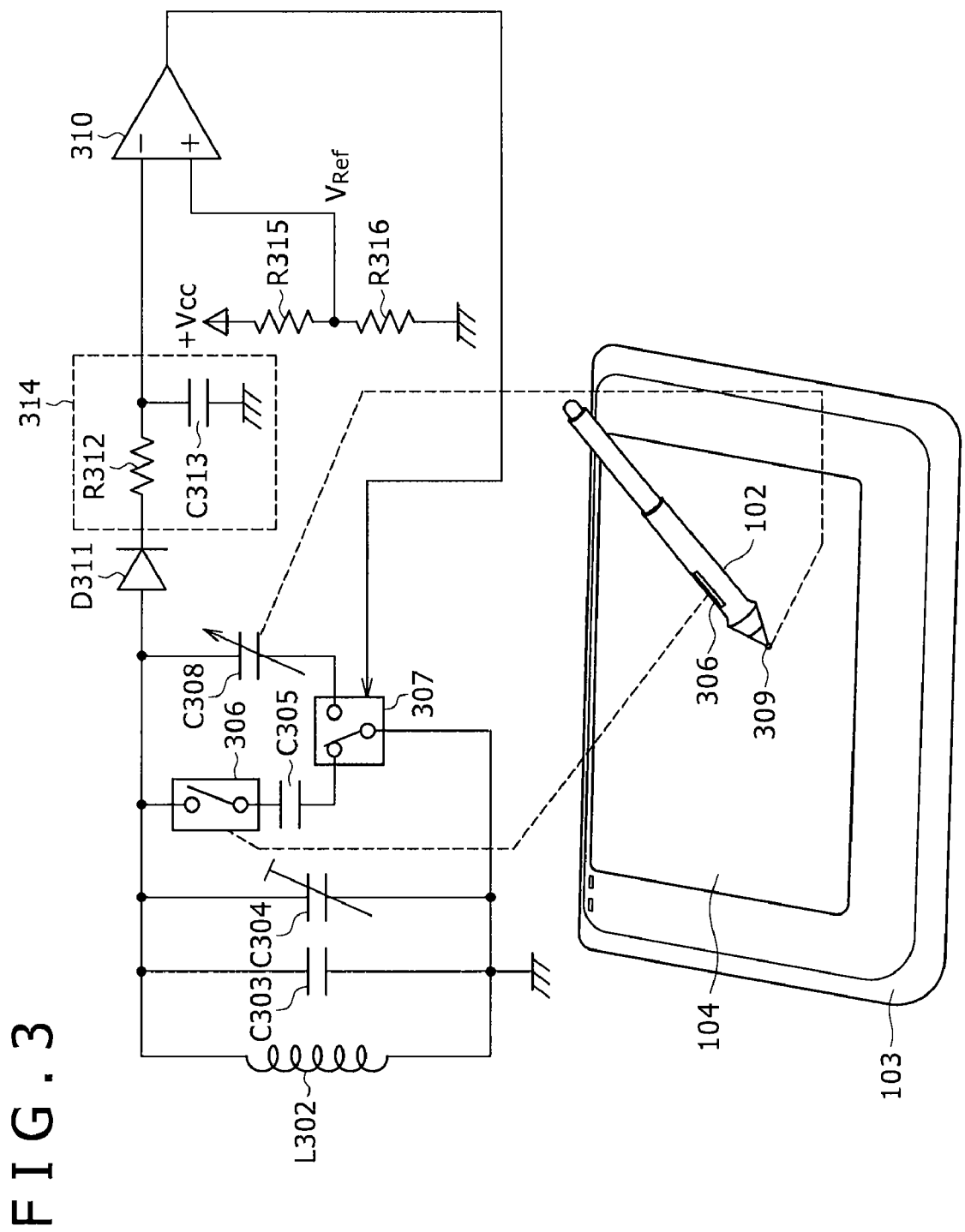
FIG. 3 is a circuit diagram of a position pointer shown in FIG. 1.

FIG. 3 shows an electric circuit of the position pointer 102. It is to be noted that a power supply and like elements are omitted in FIG. 3.

A button switch 306 is provided on a side face of a housing of the position pointer 102.

A penpoint 309 of the position pointer 102 transmits pen tip pressure to a variable capacitor C308 provided inside of the position pointer 102. The variable capacitor C308 has capacitance which varies in response to the pen tip pressure applied to the penpoint 309.

Referring to FIG. 3, a coil L302, a capacitor C303 and a semi-fixed capacitor C304 are connected in parallel to configure a resonance circuit. The coil L302 receives an electromagnetic wave from a loop coil provided on the sensor 203 of the sensor unit 103 hereinafter described. The coil L302 generates induced electromotive force when it receives an electromagnetic wave. The induced electromotive force is accumulated as charge in the coil L302 and the capacitor C303. The induced electromotive force generated at the coil L302 repetitively resonates and is accumulated as charge in the capacitor C303. When the supply of electromagnetic wave from a loop coil stops, the accumulated charge generates an ac magnetic field passing through the coil L302 of the resonance circuit back and forth, and supplies the electromagnetic wave to the loop coil provided on the sensor 203 of the sensor unit 103.

A capacitor C305 and the button switch 306 are connected in series to each other and connected in parallel to the capacitor C303 and the semi-fixed capacitor C304 through a changeover switch 307. The variable capacitor C308 is connected to the other terminal of the changeover switch 307, and also the variable capacitor C308 is connected in parallel to the capacitor C303 and the semi-fixed capacitor C304 through the changeover switch 307.

A diode D311 half-wave rectifies the ac current generated from the coil L302.

An integrator 314 formed from a resistor R312 and a capacitor C313 is connected to the cathode of the diode D311.

Current flowing from the diode D311 charges the capacitor C313 through the resistor R312. Consequently, the voltage across the capacitor C313 gradually rises in accordance with a time constant defined by the resistor R312 and the capacitor C313.

The capacitor C313 is connected to the negative input terminal of a comparator 310. A reference voltage Vref is applied to the positive side input terminal of the comparator 310. The reference voltage Vref is obtained by dividing a power supply voltage +Vcc by resistors R315 and R316 and is, for example, equal to one half the power supply voltage +Vcc.

The voltage across the capacitor C313 is compared with the reference voltage Vref by the comparator 310.

If a result of the comparison with the reference voltage Vref indicates that the voltage across the capacitor C313 exceeds the reference voltage Vref, then the potential of a control signal to be outputted from the comparator 310 varies from a high potential to a low potential. The changeover switch 307 is controlled by the control signal.

The diode D311, the integrator 314, and the comparator 310 control the changeover switch 307 to be switched when a predetermined period of time elapses. The predetermined period of time here is a period of time required after a point of time at which an electromagnetic wave is provided from the sensor unit 103 to the coil L302 and induced electromotive force is generated in the coil L302 until the voltage across the capacitor C313 exceeds the reference voltage Vref. In short, the diode D311, the integrator 314, and the comparator 310 implement the function of a timer which does not use a clock.

If the button switch 306 is controlled between on and off in a state wherein the changeover switch 307 is selectively connected to the capacitor C305, then the combined capacitance of the capacitors which form the resonance circuit varies. Accordingly, the resonance frequency of the resonance circuit varies in response to the state of the button switch 306.

Similarly, in another state wherein the changeover switch 307 is selectively connected to the variable capacitor C308, the combined capacitance of the capacitors which form the resonance circuit varies in response to the variation of the capacitance of the variable capacitor C308. Accordingly, the resonance frequency of the resonance circuit varies in response to the variation of the capacitance of the variable capacitor C308.

Figure 4:
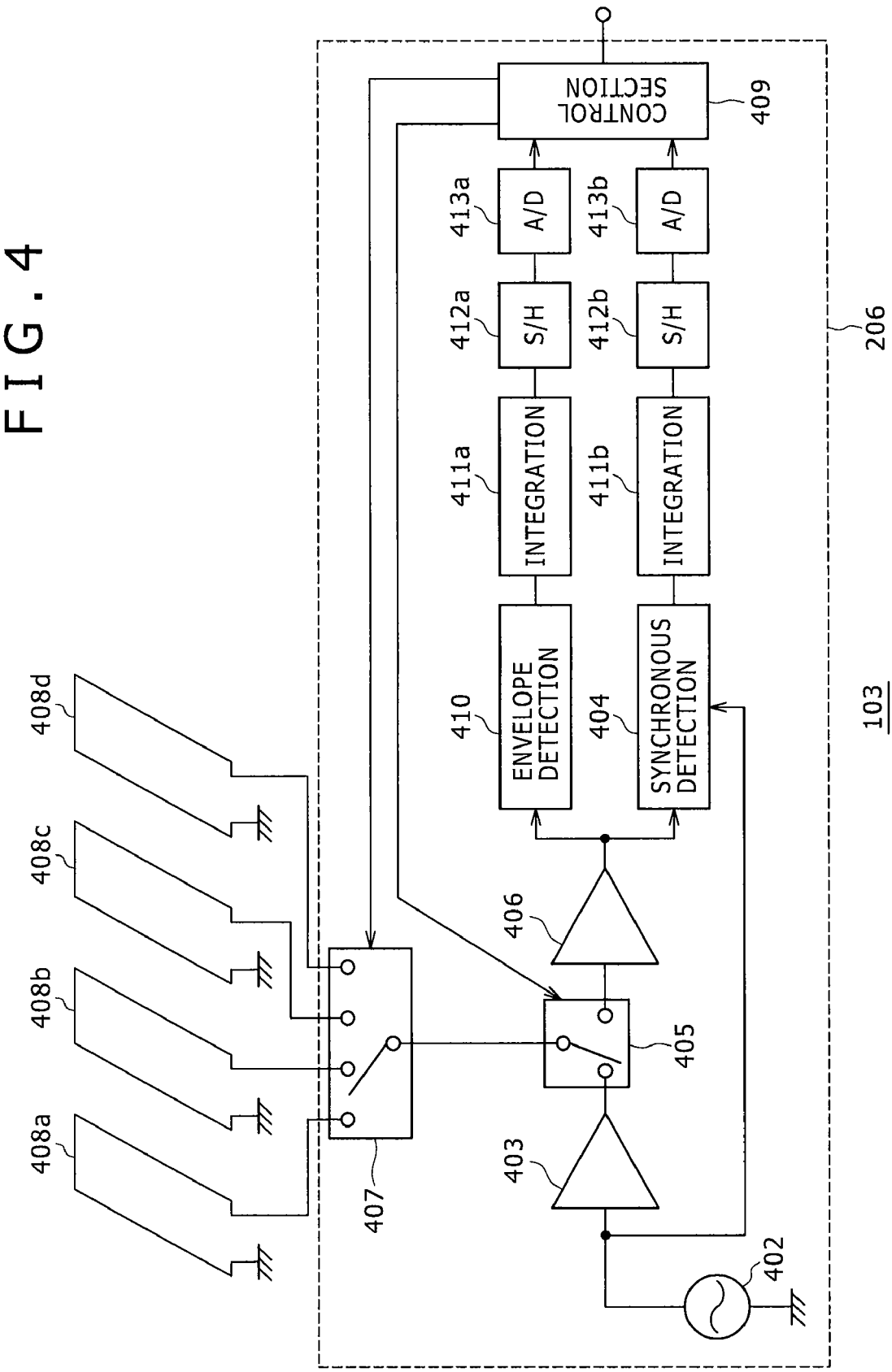
FIG. 4 is a block diagram of the sensor unit.

FIG. 4 shows a block configuration of the sensor unit 103.

Referring to FIG. 4, the sensor unit 103 includes an oscillator 402 which generates a sine wave ac signal of a frequency substantially equal to the resonance frequency of the resonance circuit of the position pointer 102 described above. The generated sine wave ac signal is supplied to a current driver 403 and a synchronous detector 404.

The current driver 403 amplifies the current of the sine wave ac signal inputted thereto from the oscillator 402 and signals the amplified sine wave ac signal to a transmission/reception changeover switch 405.

The transmission/reception changeover switch 405 exclusively connects one of an output terminal of the current driver 403 and an input terminal of a reception amplifier 406 to a selection switch 407.

The selection switch 407 selects one of a plurality of loop coils 408a, 408b, 408c and 408d and connects the selected loop coil to the transmission/reception changeover switch 405.

When the transmission/reception changeover switch 405 connects the selection switch 407 and the current driver 403 to each other, sine wave ac current supplied from the current driver 403 is supplied to one of the loop coils 408a, 408b, 408c and 408d selected by the selection switch 407.

When the transmission/reception changeover switch 405 connects the selection switch 407 and the reception amplifier 406 to each other, a signal outputted from one of the loop coils 408a, 408b, 408c and 408d selected by the selection switch 407 is inputted to the reception amplifier 406.

It is to be noted that the transmission/reception changeover switch 405 and the selection switch 407 are controlled by respective control signals supplied thereto from a control section 409 hereinafter described.

The loop coils 408a, 408b, 408c and 408d of a substantially rectangular shape are juxtaposed substantially in parallel to each other on the sensor 203 disposed immediately below the position detection plane 104 of the sensor unit 103. The loop coils 408a, 408b, 408c and 408d are connected at one of terminals thereof to the selection switch 407 and grounded at the other terminal thereof.

When one of the loop coils 408a, 408b, 408c and 408d selected by the selection switch 407 is connected to the output terminal of the current driver 403 through the transmission/reception changeover switch 405, an ac magnetic field is generated from the loop coil selected by the selection switch 407 by sine wave ac current supplied thereto from the current driver 403.

When the position pointer 102 is positioned in the proximity of a loop coil which is generating an ac magnetic field, electromotive force is generated in the coil L302 inside the position pointer 102, and charge based on the electromotive force is accumulated in the resonance circuit.

Then, if the transmission/reception changeover switch 405 is controlled by a control signal from the control section 409, then the loop coil selected by the selection switch 407 is connected to the input terminal of the reception amplifier 406. Consequently, since the supply of sine wave ac current to the loop coil selected by the selection switch 407 from the current driver 403 stops, the ac magnetic field from the loop coil disappears. On the other hand, since charge based on the induced electromotive force described hereinabove is accumulated in the resonance circuit in the position pointer 102, an ac induced magnetic field of the resonance frequency of the resonance circuit is generated from the coil L302 by the charge. When the loop coil receives this induced magnetic field, weak ac current is generated in the loop coil. The reception amplifier 406 voltage-amplifies the current and supplies a resulting voltage to the input terminal of an envelope detector 410 and the synchronous detector 404.

It is to be noted that, for the convenience of description, a state wherein the transmission/reception changeover switch 405 connects the selection switch 407 and the current driver 403 to each other is defined as transmission state, and another state wherein the transmission/reception changeover switch 405 connects the selection switch 407 and the reception amplifier 406 to each other is defined as reception state. Further, operation of the sensor unit 103 in the transmission state is defined as transmission operation, and operation of the sensor unit 103 in the reception state is defined as reception operation.

In the transmission operation, an ac magnetic field is generated from the loop coils 408a, 408b, 408c and 408d so that induced electromotive force is generated in the position pointer 102 positioned in the proximity of the loop coils 408a, 408b, 408c and 408d.

In the reception operation, an ac induced magnetic field generated from the position pointer 102 is received by any of the loop coils 408a, 408b, 408c and 408d which are positioned in the proximity of the position pointer 102.

When the position pointer 102 is not positioned in the proximity of the loop coil from which an ac magnetic field is generated, no induced electromotive force is generated in the coil L302 in the position pointer 102, and charge based on the induced electromotive force is not accumulated in the resonance circuit. Accordingly, even if the transmission/reception changeover switch 405 is changed over to the reception side, that is, to the reception amplifier 406 side, the loop coil selected by the selection switch 407 does not receive any ac induced magnetic field generated from the position pointer 102, and no ac current is generated in the loop coil.

A large number of such groups of the loop coils 408a, 408b, 408c and 408d are juxtaposed in the longitudinal direction and the transverse direction of the position detection plane 104 and changed over (switched) one by one by means of the selection switch 407, so that transmission operation and reception operation as described above are repeated among them. Consequently, a signal can be extracted from a loop coil positioned in the proximity of the position pointer 102. The position of the position pointer 102 on the position detection plane 104 is calculated based on the position of the loop coil from which the signal is obtained and also on the level of the signal.

The controlling operation of changing over (switching) the loop coils 408a, 408b, 408c and 408d one by one by means of the selection switch 407, the controlling operation of changing over (switching) the transmission/reception changeover switch 405, and the operation of calculating the position of the position pointer 102 based on the received signal are executed by the control section 409 which is formed from a well-known microcomputer.

Circuit blocks interposed between the output terminal of the reception amplifier 406 and the control section 409 are provided for changing over (switching) reception signals obtained from the loop coils 408a, 408b, 408c and 408d.

The envelope detector 410 carries out full-wave rectification of an ac reception signal.

An integration circuit 411a integrates the full-wave rectified reception signal. The integration circuit 411a integrates a weak signal on the time axis to obtain a high signal level while maintaining the S/N ratio.

A sample hold circuit 412a holds an output voltage of the integration circuit 411a at a certain point of time.

An A/D conversion circuit 413a converts an output voltage of the sample hold circuit 412a into digital data.

Through the circuits described, data corresponding to the level of the signal based on the ac induced magnetic field generated from the position pointer 102 is obtained.

The synchronous detector 404 is a well-known analog multiplication section and outputs a signal obtained by multiplying an ac signal of the oscillator 402 and the reception signal. The integration circuit 411b, sample hold circuit 412b and A/D conversion circuit 413b at the succeeding stage to the synchronous detector 404 are the same as the circuit blocks disposed following the envelope detector 410 described hereinabove.

The synchronous detector 404 carries out an operation substantially the same as that of a full-wave rectification circuit where the phases of the ac signal and the reception signal are identical to each other. However, if the phases of the ac signal and the reception signal are different, then the signal level drops. The variation of the phase in the reception signal is caused by variation of the resonance frequency of the resonance circuit of the position pointer 102. When the capacitance of the variable capacitor C308 varies in response to pressure applied to the position pointer 104 (pen tip pressure) or when the combined capacitance of the capacitors which form the resonance circuit varies as a result of incorporation of the capacitor C305 into the resonance circuit by activation of the button switch 306, the level of the signal obtained from the synchronous detector 404 varies in response to the variation of the capacitance or of the combined capacitance.

If predetermined mathematical operation processing is applied to the level of the signal obtained from the envelope detector 410 and the level of the signal obtained from the synchronous detector 404, then data corresponding to the phase of a signal based on the ac induced magnetic field generated from the position pointer 102 is obtained. Then, a state of the position pointer 102 having a shape of a pen can be determined from the variation of the phase.

Within a period of time within which the sensor unit 103 is in the reception state wherein one of the loop coils 408a, 408b, 408c and 408d is selected, if the button switch 306 is depressed, then the control signal outputted from a comparator 310 of the position pointer 102 is switched and, then, the sensor unit 103 can detect two states, that is, a state wherein the changeover switch 307 selects the capacitor C305 and another state wherein the changeover switch 307 selects the variable capacitor 308, within a period of time of the reception state. In other words, the sensor unit 103 can detect whether or not the button switch 306 is depressed or whether the pen tip pressure can be detected.

Now, general operation of the sensor unit 103 and the position pointer 102 is described.

The position pointer 102 will be moved to a position in the proximity of the sensor 203 in which the loop coils are provided, that is, in the proximity of the position detection plane 104. In the position pointer 102, the resonance circuit is built which is designed such that the coil L302, capacitor C303 and so forth are connected in parallel and resonate at approximately 562.5 kHz in one embodiment.

If the resonance circuit receives an ac magnetic field generated from the loop coil, then induced electromotive force is generated in the resonance circuit. Immediately after this, the transmission/reception changeover switch 405 is changed over to connect the loop coil to the succeeding sensor reception function section so that an ac induced magnetic field from the position pointer 102 by the induced electromotive force generated in the resonance circuit is received and the signal level is converted into data.

The procedure described is repetitively carried out for the loop coils juxtaposed in the X axis direction and the loop coils juxtaposed in the Y axis direction. Consequently, a coil which exhibits a maximum value of the detected signal level is found in regard to both of the X axis direction and the Y axis direction. Consequently, the sensor unit 103 can detect the position of the position pointer 102 on the position detection plane 104.

Structure of the Sensor 203

In the following, the structure of the sensor 203 is described with reference to FIGS. 5 and 6.

FIG. 5 schematically shows part of the sensor 203 in a form significantly shortened in the vertical (e.g., X-axis) direction in order to clearly indicate a wiring pattern of the loop coils.

Referring first to FIG. 5, the sensor 203 is a printed board having wiring patterns formed on the opposite faces thereof. In particular, longitudinal wires 502 are formed on the front face while transverse wires 503 are formed on the rear face.

The longitudinal wires 502 are connected at the opposite ends thereof to the wires on the rear face of the sensor 203 through through-holes 504.

FIG. 6 shows a shape of the wires on the sensor 203. Particularly, FIG. 6 shows one of the loop coils shown in FIG. 5 in a simplified form.

Referring to FIG. 6, a loop coil 602 is configured from loop coil windings 603a, 603b, 603c, 603d and 603e provided on the front side of the sensor 203 and inter-winding lead wires 604a, 604b, 604c and 604d provided on the rear side of the sensor 203.

The loop coil windings 603a, 603b, 603c, 603d and 603e and the inter-winding lead wires 604a, 604b, 604c and 604d which are provided on the rear side of the sensor 203 are connected to each other through through-holes 605a, 605b, 605c, 605d, 605e, 605f, 605g and 605h.

When the position pointer 102 exists within the range of an effective position detection region 606 in the position detection plane 104, the loop coil 602 resonates with the position pointer 102.

In FIG. 6, the loop coils are disposed on the sensor 203 such that each two thereof are displaced from each other. In particular, of adjacent ones of the loop coil windings shown in FIG. 6, those loop coil windings in the same winding direction belong to the same loop coil. Simply speaking, the sensor 203 has a large number of duplex winding loop coils wired thereon.

Magnetic Path Sheet 204

Figure 7A:
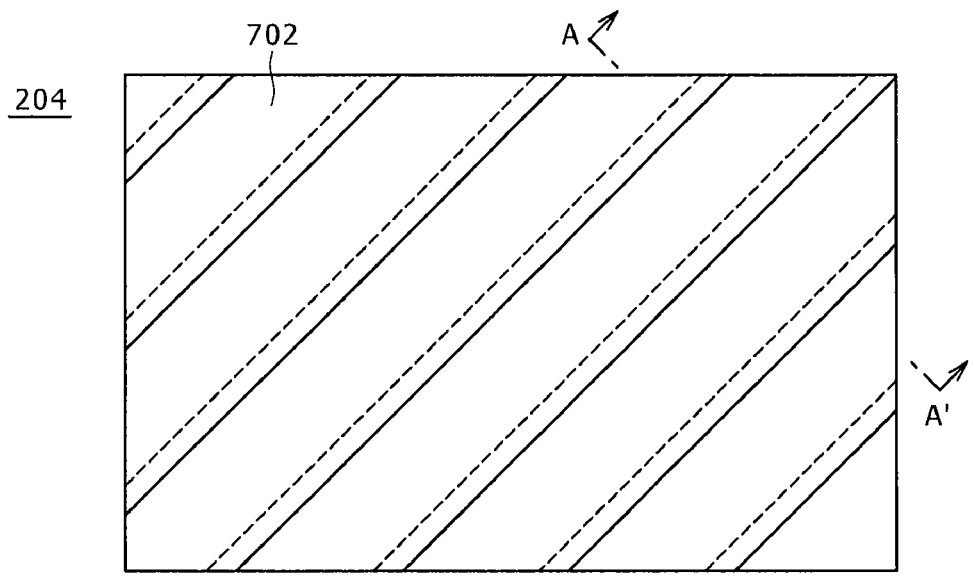
FIGS. 7A, 7B and 7C are schematic views showing a structure of a magnetic path sheet shown in FIG. 2.
Figure 7B:
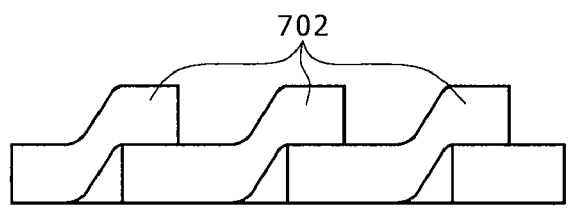
Figure 7C:
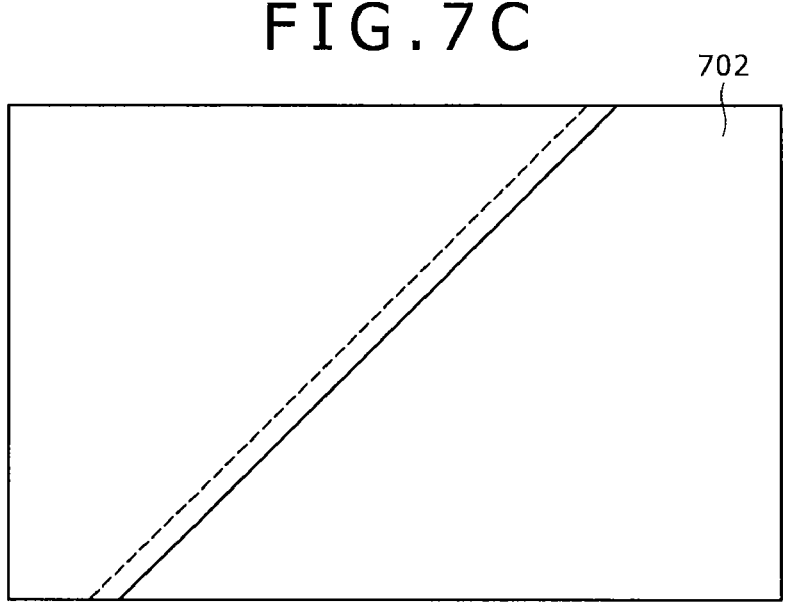

FIGS. 7A, 7B and 7C show a structure of the magnetic path sheet 204.

Particularly, FIG. 7A shows the magnetic path sheet 204 as viewed from above.

Referring to FIG. 7A, the magnetic path sheet 204 is formed in the same shape as the sensor 203 as shown in FIG. 2. The magnetic path sheet 204 includes a large number of metal ribbons 702 formed in a belt-like shape and partly superposed with each other while extending obliquely at a predetermined angle with respect to the outer profile (outline) of the magnetic path sheet 204.

The metal ribbons 702 are made of amorphous metal such as, for example, iron-silicon-boron alloy. Since amorphous magnetic metal is light in weight and exhibits superior soft magnetism, it is used for the core of a transformer for a power supply in place of an iron core or for the yoke.

The magnetic path sheet 204 is used to reinforce a magnetic field formed by the sensor 203 making use of the above-described characteristic of an amorphous magnetic metal. In other words, the magnetic path sheet 204 plays a role of a yoke for effectively introducing a magnetic flux generated from the resonance circuit of the position pointer 102 to a loop coil.

FIG. 7B shows a cross section of the magnetic path sheet 204 taken along line A-A' of FIG. 7A as viewed from the side. Although the metal ribbons 702 which form the magnetic path sheet 204 are actually formed very thin, in FIG. 7B, they are shown with an exaggerated thickness for the convenience of illustration.

The metal ribbons 702 are disposed such that adjacent ones thereof are partly superposed with each other. In other words, the metal ribbons 702 are superposed such that no gap is formed therebetween when the magnetic path sheet 204 is viewed from above.

In FIG. 7A, as an example, the metal ribbons 702 are shown disposed such that they are inclined by 45° with respect to the longitudinal direction of the magnetic path sheet 204. This angle and the superposition are used for a particular reason. The reason for the angle, width, and superposition of the metal ribbons 702 which form the magnetic path sheet 204 is hereinafter described.

FIG. 7C shows another example of the magnetic path sheet 204. Referring to FIG. 7C, where an amorphous magnetic metal used to form the metal ribbons 702 is available as a sheet having a large width, the magnetic path sheet 204 can be formed by adhering a smaller number of such sheets so that the width of the sheet can be utilized effectively to the utmost. While details are hereinafter described, since a magnetic characteristic suffers from some disorder at the adhesion location of the metal ribbons 702, preferably the number of places at which the sheets are adhered to each other is minimized.

Figure 8:
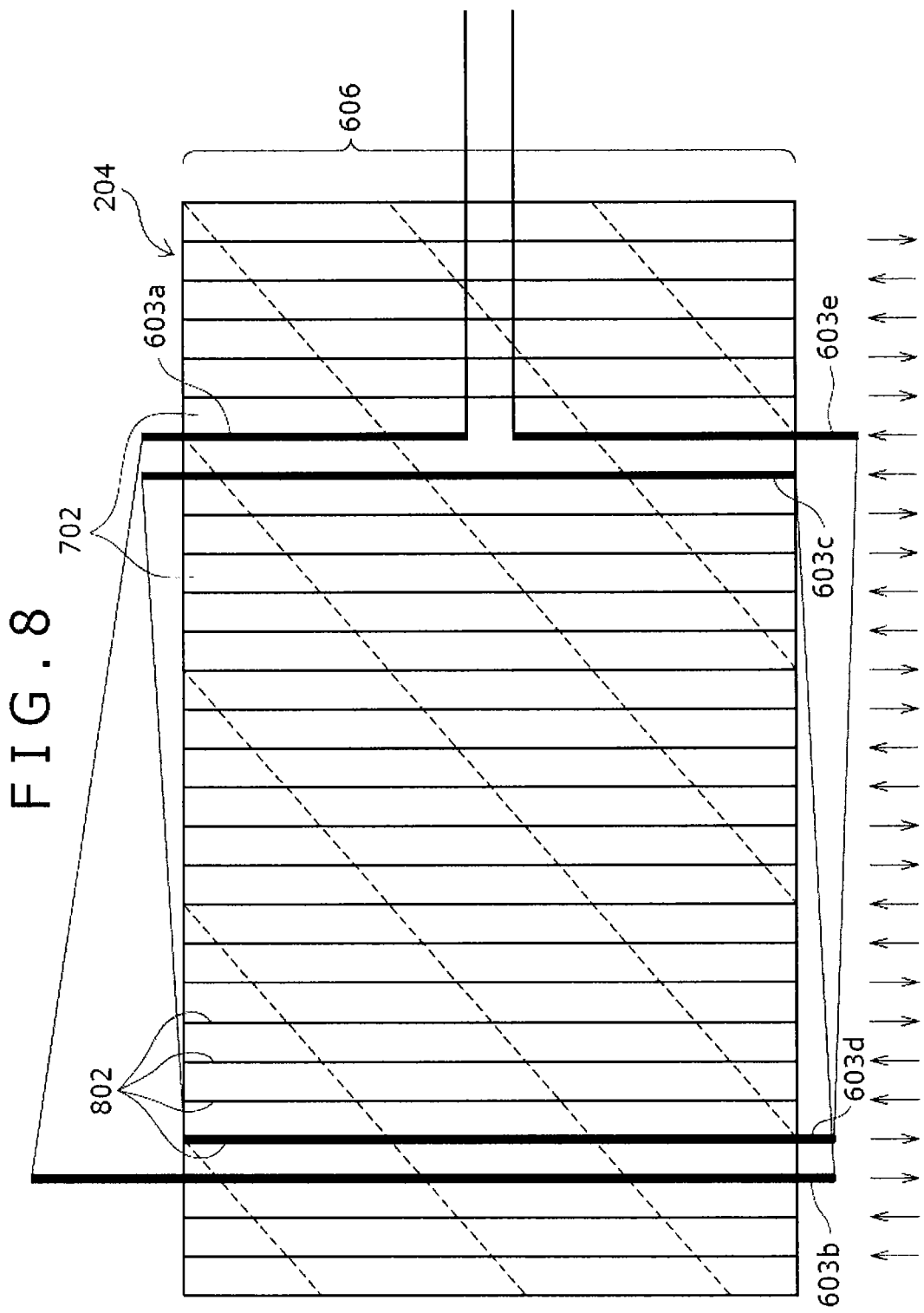
FIG. 8 is a schematic view illustrating the sensor board and the magnetic path sheet.

FIG. 8 schematically illustrates a relationship between the sensor 203 and the magnetic path sheet 204. In particular, FIG. 8 shows loop coil windings 802 of the sensor 203 and the magnetic path sheet 204 in a superposed state.

The boundary portions at which the metal ribbons 702 are adhered to each other are inclined with respect to the wiring direction of the loop coil windings 802 of the sensor 203.

Figure 9A:
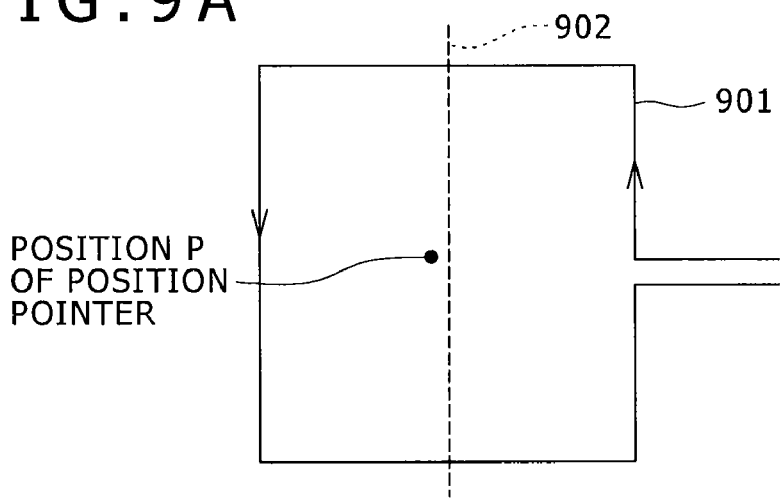
FIGS. 9A, 9B and 9C are diagrammatic views illustrating a relationship between the position pointer and loop coil windings and a principle of detection of the position of the position pointer.
Figure 9B:
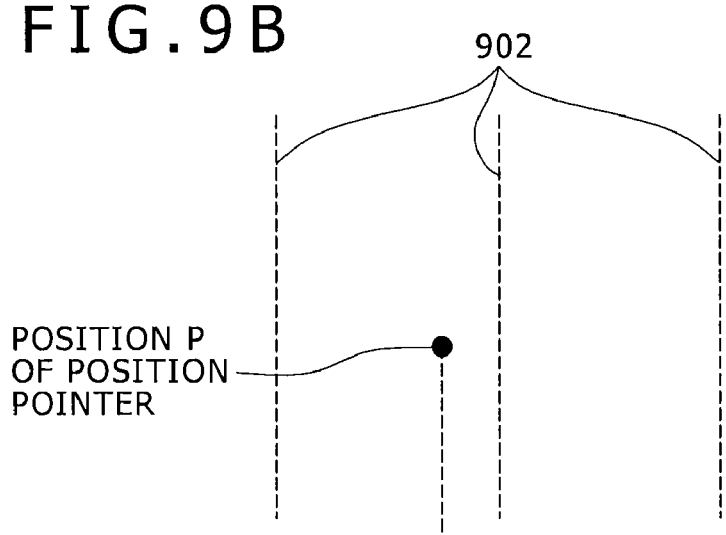
Figure 9C:
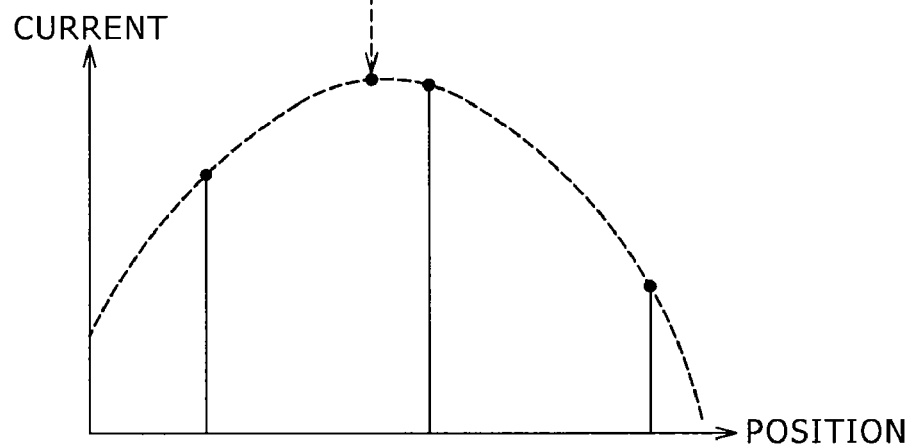

FIGS. 9A, 9B and 9C illustrate a relationship between the position pointer 102 and a loop coil 901 and a principle of detection of the position of the position pointer 102.

In particular, FIG. 9A schematically illustrates a positional relationship between the loop coil 901 and the position pointer 102. It is to be noted that, in FIG. 9A, the loop coil 901 is shown as a simplex winding coil for the convenience of illustration. The loop coil 901 here may be superposed on an adjacent loop coil.

The position pointer 102 outputs maximum current when it is positioned on the center line 902 of the loop coil 901.

FIG. 9B schematically illustrates a relationship between the center line 902 and the position pointer 102.

It is assumed now that the position pointer 102 exists at a point P shown in FIG. 9B.

The sensor unit 103 finds that the position pointer 102 is positioned in the proximity of a coil which exhibits the highest signal level detected in the loop coil group. However, in terms of the resolution of the sensor unit 103 and so forth, it is difficult to closely arrange such loop coils 901 on the sensor 203.

Therefore, the control section 409 shown in FIG. 4 carries out an interpolation mathematical operation process.

FIG. 9C illustrates an outline of the interpolation mathematical operation process.

The magnetic flux density of magnetic fluxes generated from the position pointer 102 indicates a distribution generally in accordance with a Gaussian curve with respect to the distance from the position pointer 102. Therefore, the control section 409 refers to the signal intensity of the loop coil 901 on the opposite sides of the center of the loop coil 901 at which the highest signal intensity is exhibited. Then, the control section 409 applies this to the Gaussian curve to calculate the true position of the position pointer 102. In other words, the output level of the loop coil is applied to a Gaussian curve to calculate the point P at the apex of the Gaussian curve.

The foregoing description given with reference to FIGS. 9A, 9B and 9C is based on an assumption that the signal intensity obtained from such loop coils 901 has a uniform characteristic. Naturally, it is apparent from FIG. 9C that the loop coils 901 of the sensor unit 103 must have a uniform sensitivity.

If only a particular loop coil 901 has a high sensitivity or low sensitivity, then upon interpolation mathematical operation, a wrong position will be detected as the true position of the position pointer 102.

The characteristic of the magnetic path sheet 204 contributes much to the sensitivity of the loop coil 901. In particular, the magnetic characteristic of the magnetic path sheet 204 must originally be uniform. However, although it is not impossible to form an amorphous magnetic metal sheet having a large area, the magnetic path sheet 204 requires high production cost. Further, if the sensor unit 103 has an increased size, then there is the possibility that a single amorphous magnetic metal sheet may not have a large area sufficient to cover the position detection plane 104.

Accordingly, as realistic designing, a large number of metal ribbons 702 each formed as a belt-shaped amorphous magnetic metal sheet are adhered to each other to form the magnetic path sheet 204 having an area necessary to cover the position detection plane 104.

Reason of the Superposition

Figure 10A:
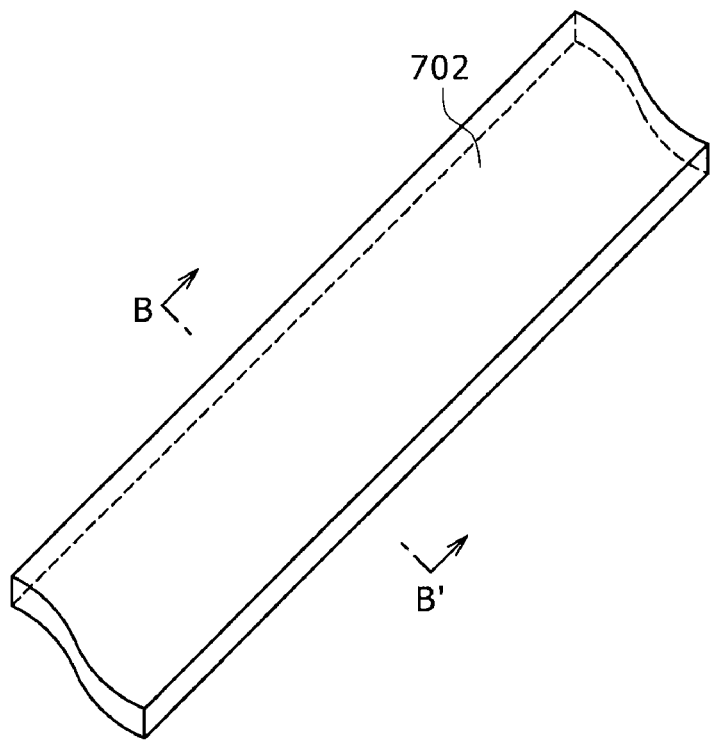
FIG. 10A is a perspective view of a metal ribbon shown in FIG. 7A or 7C and FIG. 10B is a diagrammatic view illustrating a magnetic characteristic of the metal ribbon.
Figure 10B:
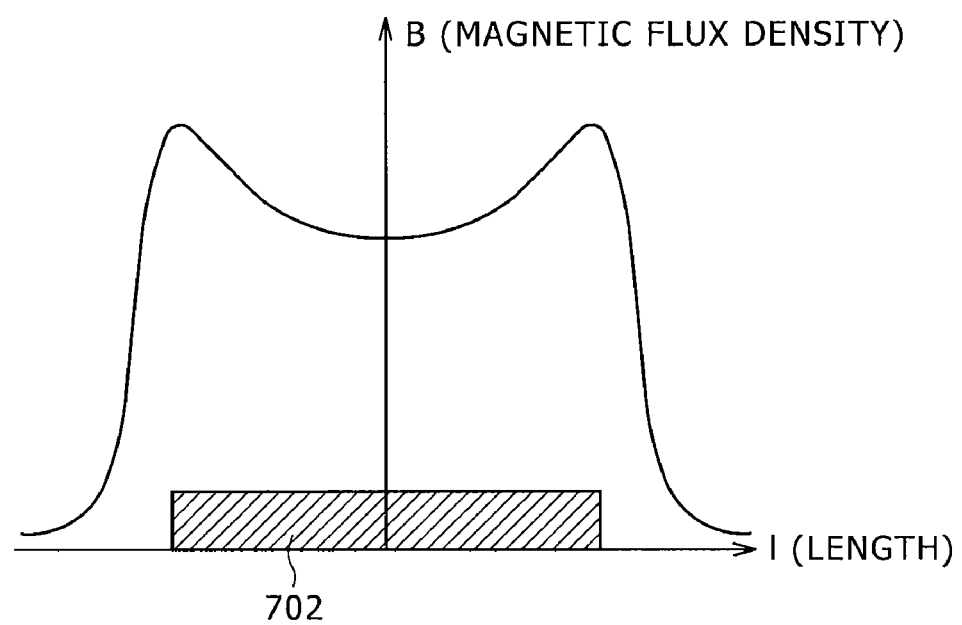

FIGS. 10A and 10B schematically illustrate a magnetic characteristic of a metal ribbon 702.

If the magnetic characteristic of a metal ribbon 702 used for the magnetic path sheet 204 is viewed from the side in a state in which the metal ribbon 702 is cut along line B-B' as seen in FIG. 10A, then such a magnetic characteristic as seen in FIG. 10B is obtained. What is to be noticed is that, at the opposite ends of the metal ribbon 702, the magnetic flux density indicates a rise because magnetic fluxes are led to the opposite ends of the metal ribbon 702 and concentrated there such that the opposite ends act as exits of the magnetic fluxes.

Figure 11A:
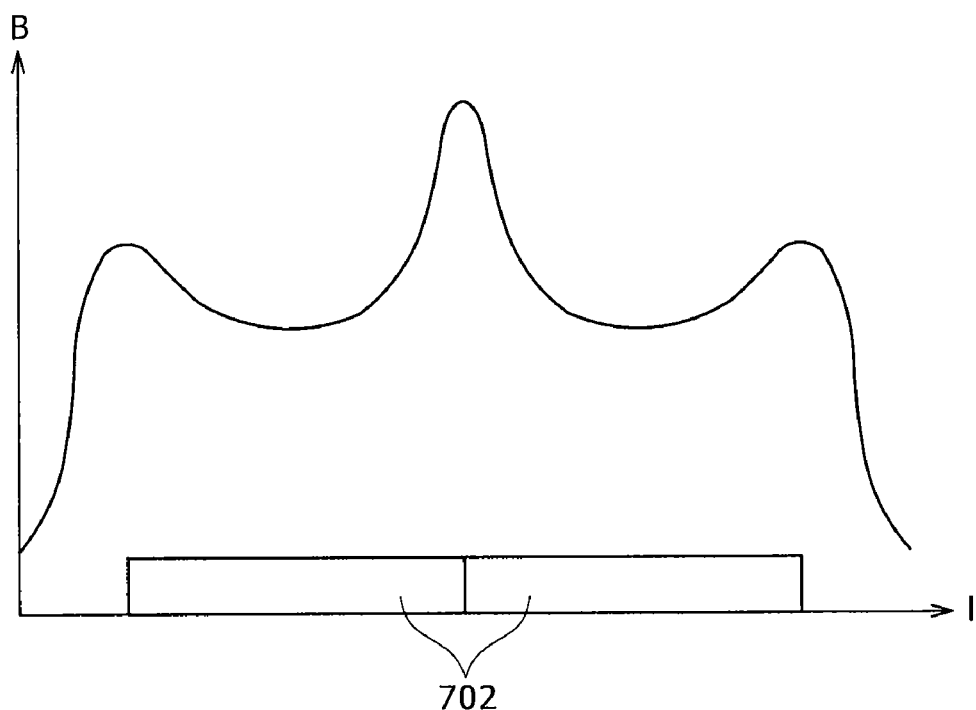
FIGS. 11A and 11B are diagrammatic views illustrating magnetic characteristics where two metal ribbons shown in FIG. 7A or 7B are abutted with each other and where two metal ribbons are partially superposed with each other, respectively.

For adhesion of the metal ribbons 702, two methods are available including a method wherein they are abutted with each other and another method wherein they are partly superposed with each other. FIG. 11A illustrates a magnetic characteristic where two metal ribbons 702 are abutted with each other, and FIG. 11B illustrates a magnetic characteristic where two metal ribbons 702 are partly superposed with each other.

More particularly, FIG. 11A shows a cross section of two metal ribbons 702 in the state wherein they are abutted with each other and a magnetic characteristic of the metal ribbons 702.

As seen in FIG. 10B, the magnetic flux density indicates a rise at the opposite end portions of the metal ribbon 702. Accordingly, if two metal ribbons 702 are abutted with each other, then the magnetic flux density further increases. The rise of the magnetic flux density is a cause of non-uniformity of the magnetic characteristic. In particular, if the metal ribbons 702 are abutted with each other, then a greater amount of magnetic fluxes leaks out at the abutted location. This is not suitable for the magnetic path sheet 204.

Figure 11B:
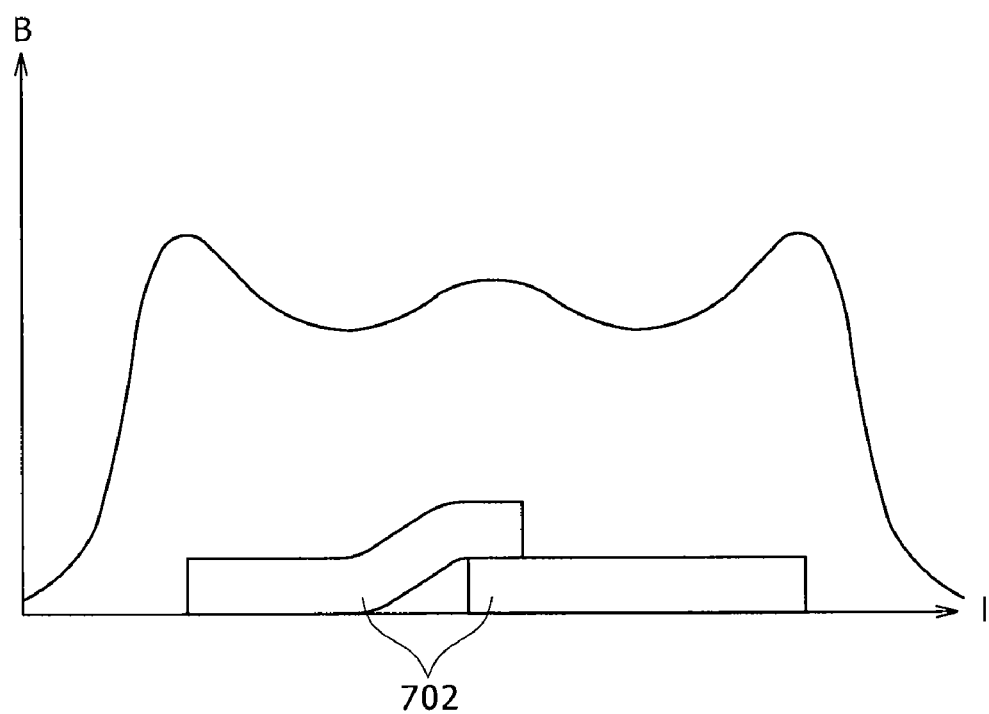

FIG. 11B shows a cross section of two metal ribbons 702 in a state wherein they are partly superposed with each other and a magnetic characteristic of the metal ribbons 702.

If two metal ribbons 702 are partly superposed with each other, then a rise of the magnetic flux density at the end portions can be suppressed. It is considered that this arises from the fact that, although, where two metal ribbons 702 are abutted with each other, magnetic fluxes flow out from a gap formed between the abutting ends of the metal ribbons 702, where two metal ribbons 702 are partly superposed with each other, such flowing out portion is not concentrated at a single point but is dispersed. In other words, it can be recognized that, if two metal ribbons 702 are partly superposed with each other, then the resulting magnetic path sheet 204 exhibits a good characteristic although it is not as good as that which is achieved by the magnetic path sheet 204 where it is formed from a single metal sheet.

Reason of the Oblique Superposition

Figure 12A:
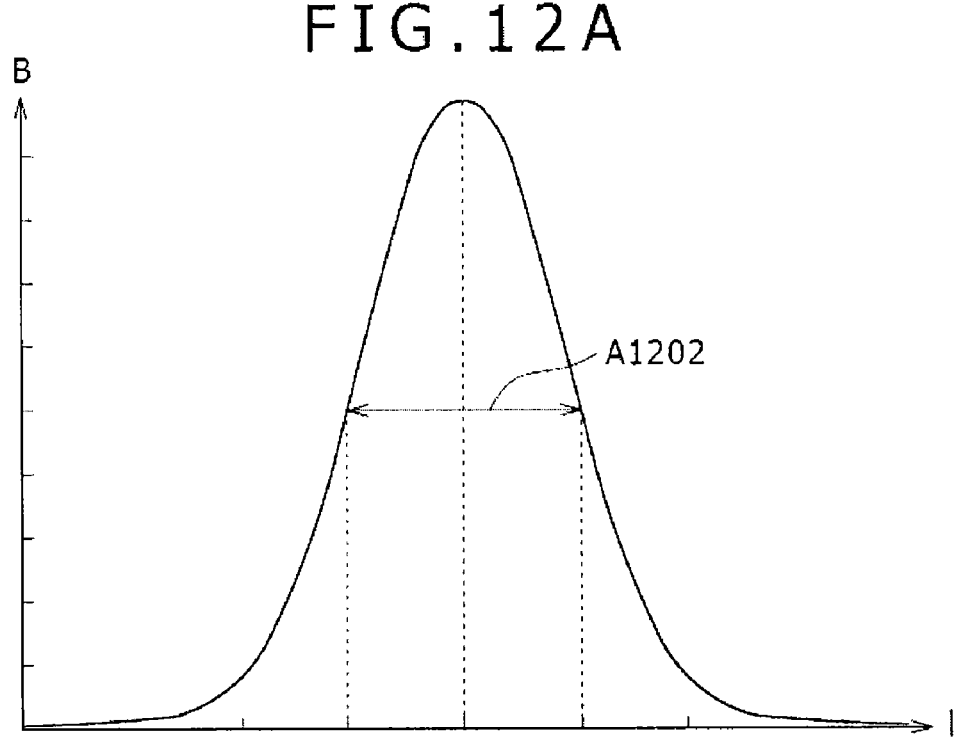
FIG. 12A is a graph illustrating a magnetic flux distribution of the position pointer and FIG. 12B is a schematic view illustrating an arrangement relationship of the position pointer, the center line of a loop coil winding, and a metal ribbon.

FIG. 12A illustrates a magnetic flux density from the position pointer 102, and FIG. 12 illustrates a positional relationship of the position pointer 102, the center line 902 of a loop coil 901 (see FIG. 9A), and metal ribbons 702.

In particular, FIG. 12A illustrates a magnetic flux density from the position pointer 102 placed on the position detection plane 104. A curve of the graph of FIG. 12A is analogous to a Gaussian curve. The range of values equal to one half the value of the apex of the magnetic density distribution indicated by a Gaussian curve is defined as half-value width. This half-value width Al202 is defined as effective position detection range.

Figure 12B:
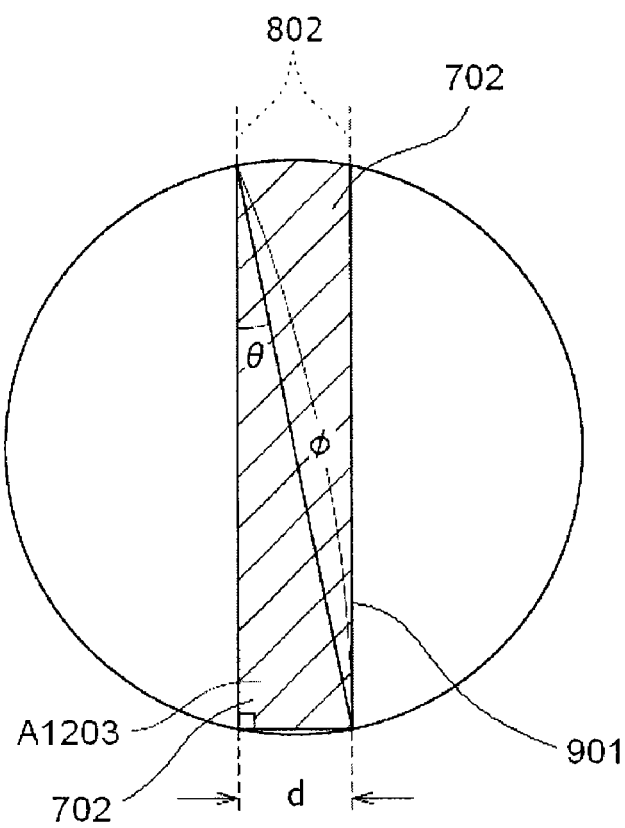

FIG. 12B illustrates a circle corresponding to (i.e., having a diameter equal to) the half-value width shown in FIG. 12A and a relationship of a loop coil 901 and a boundary portion of a superposed portion of metal ribbons 702.

A principle of moderation of disorder of a magnetic characteristic by oblique arrangement of metal ribbons 702 with respect to a loop coil 901 to form an angle therebetween is described. It is to be noted that, in order to simplify the description, it is assumed that the loop coil 901 has a simplex winding and is not superposed with an adjacent loop coil and that a signal is transmitted from the position pointer 102 to the loop coil 901, that is, the sensor unit 103 is in a reception state.

It is well known that the intensity of an electric field or a magnetic field generated from a point on a certain plane is distributed in accordance with a Gaussian distribution. To detect a magnetic field of a Gaussian distribution, an intensity of the magnetic field sufficient for distinction from peripheral noise is demanded. Where the position detection apparatus is of the electromagnetic type, it is demanded to detect a position pointer within a range of a substantially half-value width of the magnetic field distribution as an index when a weak magnetic field generated from the position detector is to be picked up.

The range of a signal from the position pointer, that is, the range in which the signal can be detected, is determined as a range of a circle having a diameter equal to the half-value width of the magnetic flux density distribution, and the diameter of the circle is represented by $\phi$. If the width of the loop coil 901 is represented by d, then the range within which the loop coil can detect a magnetic field is considered a region Al203 of the width d surrounded by the loop coil 901. It is contemplated that the influence upon a signal to be detected varies depending upon the length of the boundary portion, which disorders the magnetic flux density distribution, included in the region Al203.

In other words, as the length of the boundary portion included in the region Al203 increases, the influence on the detection signal increases.

On the contrary, if the extension direction of the boundary portion is close to a direction parallel to the center line of one loop coil, then only the loop coil including the boundary portion will be substantially influenced. Therefore, the metal ribbons 702 are arranged in an inclined relationship such that the boundary portion, which is a boundary line of the metal ribbons 702, crosses the loop coil 901 within a circle of the half-value width, which is the effective position detection range of the position pointer 102. Consequently, the metal ribbons 702 come to have an influence on the sensitivity of a plurality of adjacent loop coils. Accordingly, the possibility of erroneous detection can be reduced as compared to the case wherein the sensitivity variation appears only with a single loop coil.

If an angle $\theta$ by which the metal ribbons 702 must be inclined in the minimum is calculated in accordance with the study given above, then the inclination angle $\theta$ necessary for the metal ribbons 702 can be represented by the following expression:

$$\theta = \sin^{-1}(d/\phi)$$

The inclination angle $\phi$ is set equal to or greater than 12°.

As an example, where $\phi$ is 30 mm and d is 6.4 mm, $\theta$ is approximately 12.32°.

On the contrary, if the inclination angle $\theta$ of the metal ribbons 702 is determined, then the length of the boundary portion which traverses the region Al203 can be calculated. Where the length of the boundary portion is represented by $\phi'$, it can be represented by the following expression:

$\varphi'=d/\sin\theta$

As an example, where d is 6.4 mm, the length p' of the boundary portion when the inclination angle θ is 15° is 24.72 mm; the length p' of the boundary portion when the inclination angle θ is 45° is 9.05 mm; and the length p' of the boundary portion when the inclination angle θ is 90° is 6.4 mm.

However, where the inclination angle θ is greater than 45°, the boundary portion comes to have an influence upon other sensor coils extending in an orthogonal direction.

From the foregoing, 45° is an angle which minimizes the influence of the boundary portion.

While the foregoing description is given assuming that the loop coil has a simplex winding, the basic way of thinking applies similarly also where the loop coil has duplex windings as described hereinabove with reference to FIGS. 6 and 8 or has a greater number of windings. Calculation similar to that described hereinabove may be executed to determine that, from among a plurality of loop coil windings 802 which belong to the same loop coil, those loop coil windings 802 having the same winding direction may be regarded as a virtual single loop coil winding.

Figure 13:
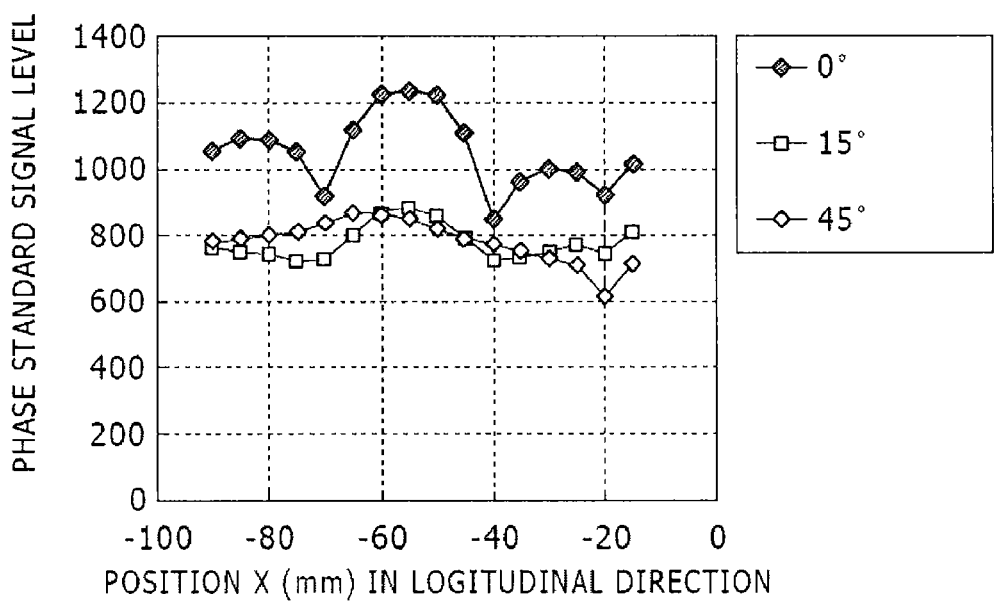
FIGS. 13, 14 and 15 are graphs showing signal levels when a signal sent from the position pointer is detected by the loop coils.

FIG. 13 illustrates the signal level when a signal sent from the position pointer 102 is detected by the loop coils. In particular, FIG. 13 illustrates the signal level in those cases wherein the inclination angle θ of the boundary portion with respect to the longitudinal direction of the loop coils is 0°, 15° and 45° where metal ribbons 702 are abutted with each other without being superposed on each other.

The position of a peak at the center of the curve of 0° corresponds to the boundary portion where the metal ribbons 702 are abutted with each other. It can be seen that magnetic fluxes flow out from a very small gap formed at the boundary portion at which the metal ribbons 702 are abutted with each other, and portions at which the magnetic flux density is comparatively low appear on the opposite sides of the gap.

If the curve of 0° is compared with the curve of 15° or of 45°, then it can be observed apparently that the difference between the peak and the bottom of the signal level of the latter curve is significantly small.

From FIG. 13, it can be recognized that, by forming the boundary portion at which the metal ribbons 702 are abutted with each other such that it is inclined with respect to the loop coils, the influence of the boundary portion upon the loop coil concerning signal detection can be reduced.

Figure 14:
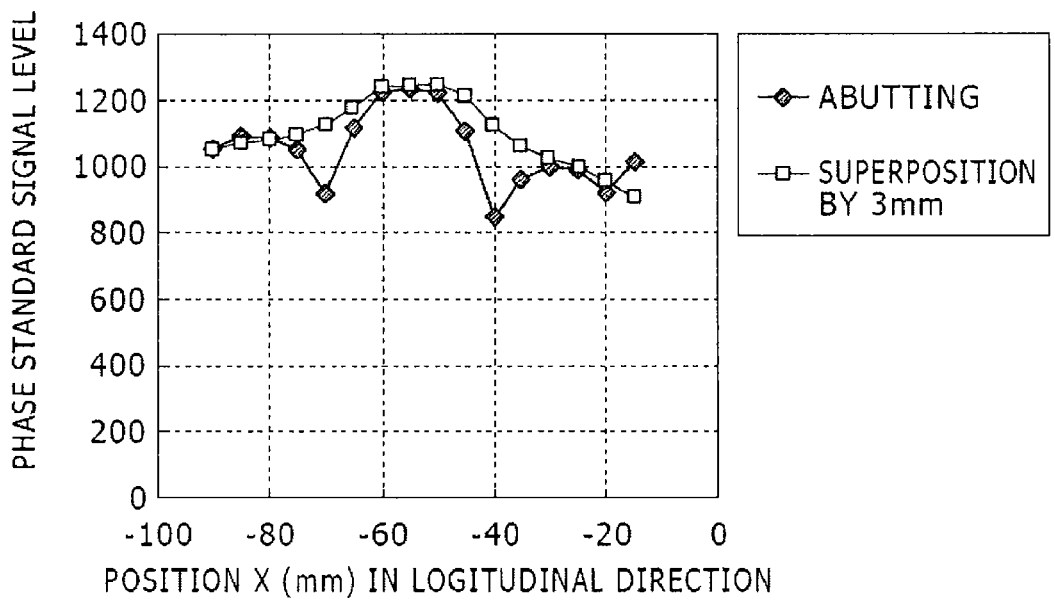

FIG. 14 illustrates the signal level when a signal sent from the position pointer 102 is detected by the loop coils. In particular, FIG. 14 illustrates the signal level where metal ribbons 702 are abutted with each other without being superposed on each other and the signal level where metal ribbons 702 are partly superposed with each other over 3 mm. It is to be noted that, in both cases, the boundary portion is inclined with respect to the loop coil windings 802.

If the curve of the signal level where the metal ribbons 702 are abutted with each other is compared with the curve of the signal level where the metal ribbons 702 are superposed on each other, then it can be recognized apparently that the difference between the peak and the bottom of the signal level of the latter case is significantly small.

From FIG. 14, it can be recognized that, by superposing the metal ribbons 702 on each other, the influence of the boundary portion between the metal ribbons 702 upon signal detection by the loop coils can be reduced.

Figure 15:
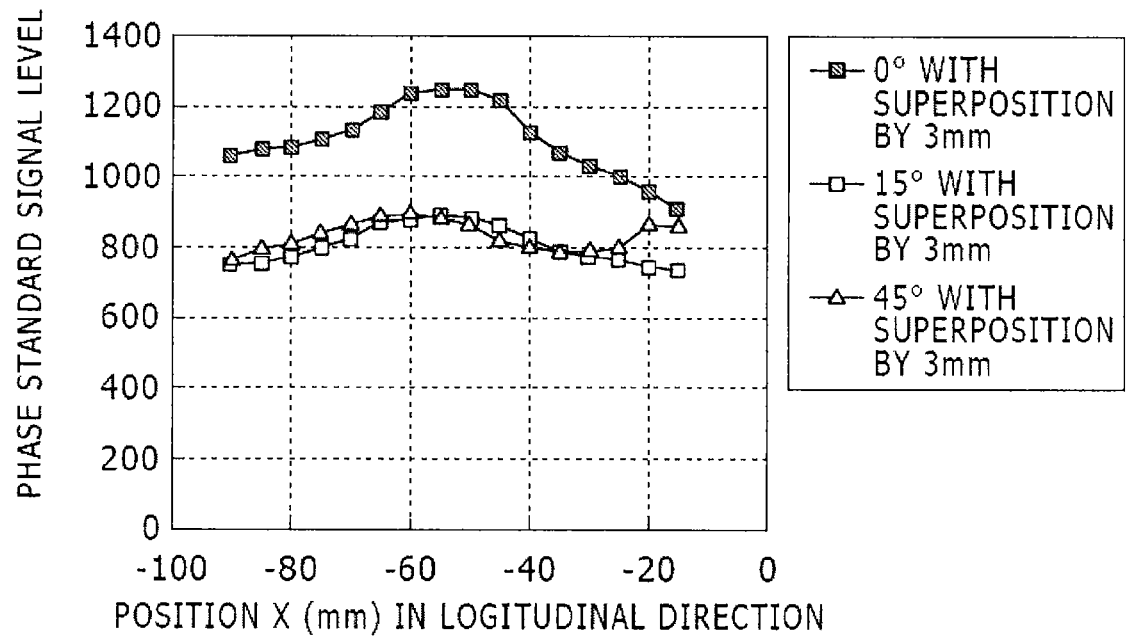

FIG. 15 illustrates the signal level when a signal sent from the position pointer 102 is detected by the loop coils. In particular, FIG. 15 illustrates the signal level where metal ribbons 702 are superposed on each other over 3 mm and besides the boundary portion of the metal ribbons 702 is disposed at the angles of 0°, 15° and 45° with respect to the longitudinal direction of the loop coils.

If the curve of the signal level where the inclination angle is 0° is compared with the curve of the signal level where the inclination angle is 15° or 45°, then it can be recognized apparently that the difference between the peak and the bottom of the signal level of the latter case is significantly small.

From FIG. 15, it can be recognized that, by superposing the metal ribbons 702 on each other when additionally the boundary portion of the metal ribbons 702 is inclined with respect to the loop coils 802, the influence of the boundary portion upon the loop coil concerning signal detection can be reduced to the minimum.

The present embodiment may have such applications as described below.

(1) The sensor unit 103 may be configured such that the upper case 202 thereof includes a liquid crystal panel, which has a protective glass plate on the surface thereof, and which may be provided in place of the upper case 202 or formed integrally with the upper case 202.

(2) The position detection apparatus described above in the description of the present embodiment can be incorporated as part of an electronic computer.

Figure 16:
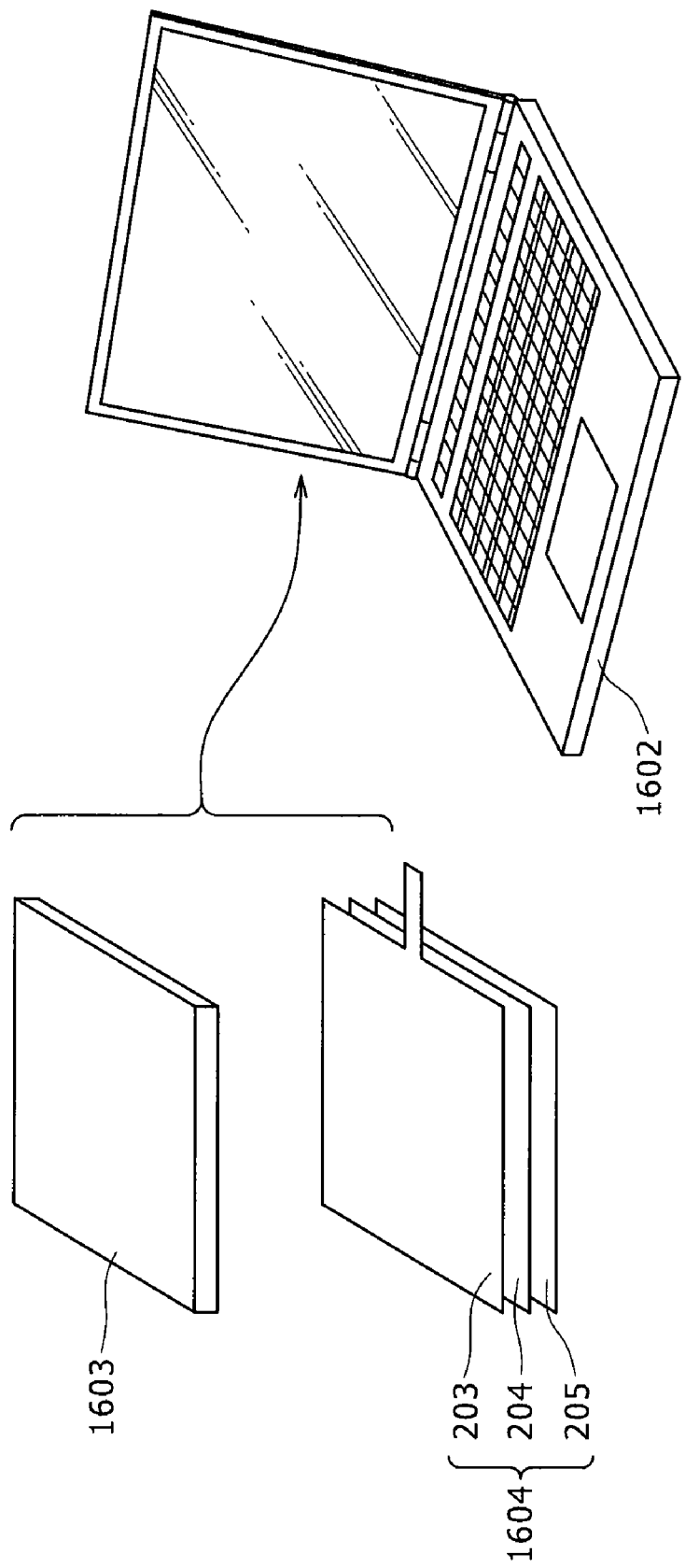
FIG. 16 is a schematic view of a notebook type personal computer to which the position detection apparatus is applied.

FIG. 16 schematically shows a notebook type personal computer.

Referring to FIG. 16, the notebook type personal computer 1602 which is a kind of well-known electronic computer includes a sensor unit 1604 disposed on the rear face of an LCD unit 1603. The sensor unit 1604 is configured such that the sensor 203, magnetic path sheet 204 and shield sheet 205 described hereinabove with reference to FIG. 2 are superposed on each other.

The signal processing section 206 described hereinabove with reference to FIGS. 2 and 4 is connected to the sensor 203, and the signal processing section 206 is incorporated in the inside of the notebook type personal computer 1602.

It is to be noted that the control section 409 in the signal processing section 206 of FIG. 4 can be replaced by a mathematical operation function of the notebook type personal computer 1602. In particular, A/D converters 413*a* and 413*b* are connected to an internal bus of the notebook type personal computer 1602 while the control section 409, which is a microcomputer, is omitted.

The present embodiment disclosed herein is directed to a position detection apparatus.

The magnetic path sheet disposed immediately below the coil board of the electromagnetic induction type position detection apparatus is configured by superposing ribbons of amorphous magnetic metal such that they extend obliquely. By configuring the magnetic path sheet in this manner, the variation of the sensitivity of coils in the proximity of a joining portion of the metal ribbons can be suppressed. Accordingly, a position detection apparatus can be implemented which is superior in detection sensitivity of a position pointer, position detection accuracy, noise resistance, and performance.

While a preferred embodiment of the present invention has been described using specific terms, such description is for illustrative purposes only, and it is to be understood that changes and variations may be made without departing from the spirit or scope of the following claims.

What is claimed is:
1. A position detection apparatus, comprising:
a position pointer having at least one coil; and a sensor unit comprising: (a) a sensor board including a plurality of loop coils juxtaposed and extending in a predetermined direction, the sensor unit being configured to detect a signal generated in said loop coils by electromagnetic induction between said coil of said position pointer and said loop coils to detect the position of said position pointer relative to the sensor board; (b) a shield member disposed on the side of the sensor board opposite to that of said position pointer for reducing noise, and (c) a magnetic path sheet formed from a plurality of magnetic path members of a substantially rectangular shape having a higher magnetic permeability than that of said shield member and disposed between said sensor board and said shield member;

said magnetic path members having contacting portions at which said magnetic path members contact with each other;

said contacting portions being disposed in an inclined relationship relative to said extending direction of the loop coils such that the contacting portions cross said extending direction at a predetermined angle.

2. The position detection apparatus according to claim 1, wherein said magnetic path sheet is formed from said magnetic path members that are partly superposed with each other.

3. The position detection apparatus according to claim 2, wherein said magnetic path sheet is formed from a plurality of magnetic ribbons.

4. The position detection apparatus according to claim 3, wherein the magnetic ribbons are formed from amorphous magnetic metal.

5. The position detection apparatus according to claim 1, wherein said shield member is formed from an aluminum thin film sheet.

6. The position detection apparatus according to claim 5, further comprising an upper case and a liquid crystal panel, which is integrated with said upper case and having protective glass provided on the surface thereof.

7. The position detection apparatus according to claim 6, wherein an inclination angle $\theta$ of the magnetic ribbons with respect to said loop coils is greater than $\theta = \sin^{-1}(d/\phi)$ based on the width d of said loop coil and the diameter $\phi$ of a circle of a half-value width of a magnetic flux density distribution formed by said position pointer on said sensor board.

8. The position detection apparatus according to claim 7, wherein the inclination angle $\theta$ is equal to or greater than 12°.

9. The position detection apparatus according to claim 8, wherein the predetermined angle is about 15°.

10. The position detection apparatus according to claim 8, wherein the predetermined angle is about 45°.

11. A sensor unit, comprising:

a sensor board including a plurality of loop coils juxtaposed and extending in a predetermined direction, the sensor unit being configured to detect a signal generated in said loop coils by electromagnetic induction between a coil of a position pointer and said loop coils to detect the position of said position pointer relative to the sensor board;

a shield member disposed on the side of the sensor board opposite to that of said position pointer for reducing noise; and a magnetic path sheet formed from a plurality of magnetic path members of a substantially rectangular shape having a higher magnetic permeability than that of said shield member and disposed between said sensor board and said shield member;

said magnetic path members having contacting portions at which said magnetic path members contact with each other; and said contacting portions being disposed in an inclined relationship by a relative to said extending direction of the loop coils such that the contacting portions cross said extending direction at a predetermined angle.

* * * * *